United States Patent
Bartoschewski

(10) Patent No.: US 7,986,461 B2
(45) Date of Patent: Jul. 26, 2011

(54) DEVICE FOR SHAPING LASER RADIATION

(75) Inventor: Daniel Bartoschewski, Gelsenkirchen (DE)

(73) Assignee: LIMO Patentverwaltung GmbH & Co., Gerstengrund (DE)

( * ) Notice: Subject to any disclaimer, the term of this patent is extended or adjusted under 35 U.S.C. 154(b) by 224 days.

(21) Appl. No.: 12/336,143

(22) Filed: Dec. 16, 2008

(65) Prior Publication Data

US 2009/0159820 A1 Jun. 25, 2009

(30) Foreign Application Priority Data

Dec. 19, 2007 (DE) .................. 10 2007 061 358

(51) Int. Cl.
*G02B 27/10* (2006.01)
(52) U.S. Cl. ...................................... 359/622
(58) Field of Classification Search .............. 359/622, 359/623, 629, 639; 362/268
See application file for complete search history.

(56) References Cited

U.S. PATENT DOCUMENTS

| | | | |
|---|---|---|---|
| 6,717,105 B1 | 4/2004 | Okamoto et al. | |
| 6,952,510 B1 | 10/2005 | Karlsen et al. | |
| 7,035,014 B2 * | 4/2006 | Mikhailov et al. | 359/641 |
| 2003/0089691 A1 | 5/2003 | Tanaka | |
| 2004/0040938 A1 | 3/2004 | Yamazaki et al. | |
| 2004/0136416 A1 | 7/2004 | Tanaka et al. | |
| 2005/0035104 A1 | 2/2005 | Tanaka et al. | |
| 2005/0063428 A1 | 3/2005 | Anikitchev et al. | |
| 2006/0102599 A1 | 5/2006 | Adams et al. | |
| 2006/0176912 A1 | 8/2006 | Anikitchev | |

FOREIGN PATENT DOCUMENTS

| | | |
|---|---|---|
| DE | 10106155 A1 | 8/2002 |
| DE | 10118788 A1 | 10/2002 |
| DE | 10136611 C1 | 11/2002 |
| WO | 00 42465 A1 | 7/2000 |
| WO | 2005085934 A1 | 9/2005 |
| WO | 2006066706 A2 | 6/2006 |
| WO | 2007078456 A1 | 7/2007 |

OTHER PUBLICATIONS

European Search Report dated Jan. 22, 2007.
Deutches Patent-und Markenamt, German Search Report dated Aug. 14, 2008.
European Search Report in corresponding EP Application 08 02 0687 dated Nov. 17, 2010.

* cited by examiner

*Primary Examiner* — Joseph Martinez
(74) *Attorney, Agent, or Firm* — Norris McLaughlin & Marcus, PA; Christa Hildebrand, Esq.

(57) ABSTRACT

Device for shaping laser radiation which has sub-beams (3) spaced apart in a first direction (X) perpendicular to the propagation direction (Z) of the laser radiation, in particular for shaping laser radiation which is output by a laser diode bar (1), comprising a first refractive interface (8) which can differently deviate at least a multiplicity of the sub-beams (3) of the laser radiation to be shaped, so that they travel at least partially converging together after passing through the first interface (8) more than before passing through the first interface (8), and furthermore comprising a second refractive interface (9) through which the laser radiation can pass after having passed through the first interface (8), the second interface (9) being able to deviate at least some of the sub-beams (3) so that their convergence is reduced.

14 Claims, 2 Drawing Sheets

DEVICE FOR SHAPING LASER RADIATION

BACKGROUND OF THE INVENTION (1) Field of the Invention

The present invention relates to a device for shaping laser radiation which has sub-beams spaced apart in a first direction perpendicular to the propagation direction of the laser radiation, in particular for shaping laser to radiation which is output by a laser diode bar.

Definitions: in the propagation direction of the light to be influenced means the average propagation of the light, particularly when it is not a plane wave or is at least partially convergent or divergent. Light beam, sub-beam or beam, unless expressly indicated otherwise, does not mean an idealized ray of geometrical optics but a real light beam, for example a light beam with a Gaussian profile, which has an extended rather than infinitesimally small beam cross section.

Laser diode bars have a multiplicity of emitters, for example 19 emitters, which are arranged spaced apart in the so-called slow axis. The slow axis is the aforementioned first direction in which the active layer of the semiconductor diode extends, while the fast axis is the direction perpendicular thereto. For example, each of the emitters has a length of about 150 µm in the slow axis, the distance between two neighboring emitters in this direction being about 400 µm. The effect of this is that there are dark regions between the sub-beams output by the individual emitters, which are found to be disadvantageous for the brightness (specific intensity) of the laser radiation.

(2) Description of Related Art

In the prior art the sub-beams of laser diode bars, which are output by the individual emitters, are collimated by micro-optics in the fast axis and sometimes also in the slow axis, without the periodicity of the beams of the individual emitters being manipulated. An example of this may be found in WO 2005/085934 A1. In this prior art, further beam-shaping optics are therefore used in order to achieve a particular beam profile, depending on the application. The dark region between the emitters is tolerated, which places a limit on the achievable brightness. Owing to the bar structure, there is therefore a design-related limit for the brightness of the overall laser system which is markedly different from the physical limit.

Another example of beam-shaping optics may be found in DE 101 06 155 A1. There, the laser radiation output by a laser diode bar is split into two parts in the slow axis, these parts subsequently being superimposed on one another in the fast axis. The cross section of the laser radiation is therefore converted from an elongated rectangular shape into a less elongated rectangular shape, which can be focused better onto the end of a light guide fiber.

BRIEF SUMMARY OF THE INVENTION

It is an object of the present invention to provide a device of the type mentioned in the introduction, with which the laser radiation output by a laser diode bar can be shaped so that it has a greater brightness and/or it can be focused better.

This is achieved according to the invention by a device having the features of claim 1. The dependent claims relate to preferred embodiments of the present invention.

According to claim 1, the device comprises a first refractive interface which can differently deviate at least a multiplicity of the sub-beams of the laser radiation to be shaped, so that they travel at least partially converging together after passing through the first interface more than before passing through the first interface, and the device furthermore comprises a second refractive interface through which the laser radiation can pass after having passed through the first interface, the second interface being able to deviate at least some of the sub-beams so that their convergence is reduced. By reducing or eliminating the distance between the sub-beams in the first direction, the dark region between the individual sub-beams can be reduced so that the achievable brightness can be brought closer to the physical limit.

One option is that the first refractive interface can differently deviate at least a multiplicity of the sub-beams of the laser radiation to be shaped, so that after passing through the first interface they are aligned at a point which is arranged behind the second refractive interface in the propagation direction of the laser radiation.

Another option is for the device to comprise collimation means which can at least partially collimate the laser radiation with respect to the first direction and/or with respect to a second direction which is perpendicular to the first direction and to the propagation direction of the laser radiation, the collimation means in particular being arranged before the first refractive interface in the propagation direction of the laser radiation.

In particular, the second interface may deviate at least some of the sub-beams so that the convergence of the sub-beams is reduced, such that they travel mutually parallel with deviations of ±10%, preferably ±5%, in particular ±1%. The individual sub-beams can therefore be parallel again after passing through the second refractive interface, the periodicity and dark region being manipulated. A brightness is thereby achieved which is higher than that which is possible with previously available optics.

It is possible for the first and/or second of the refractive interfaces respectively to comprise a multiplicity of mutually inclined surfaces, at least one of the sub-beams in particular being able to pass through each of the surfaces. Some of the sub-beams, in particular all the sub-beams, are therefore refracted at different angles from one another. For example, the deviation angles of the sub-beams having passed through the individual surfaces of the first refractive interface may differ so that, after passing through the first refractive interface, all the sub-beams are aligned at a point which is arranged behind the second refractive interface in the propagation direction of the laser radiation. In particular, the deviation angles of the sub-beams having passed through the individual surfaces of the second refractive interface may differ so that all the sub-beams travel mutually parallel after passing through the second refractive interface, the distance between the sub-beams in the first direction in particular having been reduced or essentially no longer existing.

The mutually inclined surfaces may be at least partially plane and at least partially adjoin one another in the first direction.

The mutually inclined surfaces of each of the two refractive interfaces may be arranged respectively on at least one cylindrical contour.

In particular, the at least one cylindrical contour on the first refractive interface may be shaped convexly. The at least one cylindrical contour on the second refractive interface may in this case be shaped concavely. This provides a correspondence of the refracting angles of the plane surfaces on the first and second refractive interfaces. In particular the surfaces of the first refractive interface, which adjoin one another in the first direction, may at least partially make an angle of between 150° and 180° with one another, in particular an angle of between 165° and 180°, preferably an angle of between 175° and 179°. Correspondingly the surfaces of the second refractive interface, which adjoin one another in the first direction, may at least partially make an angle of between 180° and 210° with one another, in particular an angle of between 180° and 195°, preferably an angle of between 181° and 185°. The second refractive interface then in particular has the same number of plane surfaces, which are aligned so that the individual sub-beams are refracted respectively with the negative angle compared with the first refractive interface, before they reach the point at which they are aligned.

As an alternative to this, the angles between the plane surfaces on the first refractive interface may be different to the angles between the plane surfaces on the second refractive interface. In this way, despite the deviation angles of the sub-beams corresponding to one another at the first and second interfaces, the refractive index of the material in which the first interface is formed may be different to the refractive index of the material in which the second interface is formed.

It is furthermore possible for the first and/or second of the refractive interfaces to have at least two groups of mutually inclined surfaces, each of the groups being arranged on its own cylindrical contour.

Another option is for the at least two cylindrical contours on the first refractive interface to be arranged next to one another in the first direction.

The at least two cylindrical contours on the second refractive interface may be arranged spaced apart in the first direction. This provides the opportunity to combine the sub-beams in two separate groups, which may then be compactly superimposed by geometrical coupling, polarization coupling or wavelength coupling in order to assist the aim of forming a symmetrical beam profile. Such a profile is suitable for example for launching the laser radiation into light guide fibers, which have a likewise symmetrical end surface.

As mentioned, previous solutions for the splitting use separate optics. The device according to the invention obviates such separate optics, which have only fulfilled the purpose of splitting the individual beams into two or more groups. Rather, with the device according to the invention, the increase in brightness by eliminating the dark regions may be combined with splitting the sub-beams. The results of this second function are a shorter beam path and a reduction in complexity. It is possible to produce fiber-coupled laser systems having fibers with a core diameter of 50 μm and a numerical aperture (NA)=0.22, or a core diameter of 100 μm and an NA=0.12 when using laser diode bars with broad strip emitters (BALB) as a light source. Extension to multi-bar systems is likewise possible.

It is possible for the device to comprise two substrates which are arranged successively, in particular spaced apart, in the propagation direction of the laser radiation.

Another option is for one of the refractive interfaces to be arranged on each of the substrates.

In this case, the first refractive interface may be the entry surface of the first substrate and/or the second refractive interface may be the exit surface of the second substrate.

Furthermore the exit surface of the first substrate may be plane and/or the entry surface of the second substrate may be plane.

Other features and advantages of the present invention will become clear from the following description of preferred exemplary embodiments with reference to the appended drawings, in which:

BRIEF DESCRIPTION OF THE SEVERAL VIEWS OF THE DRAWING(S)

DETAILED DESCRIPTION OF THE INVENTION

In the figures, Cartesian coordinate systems are indicated for better guidance.

Figure 1:
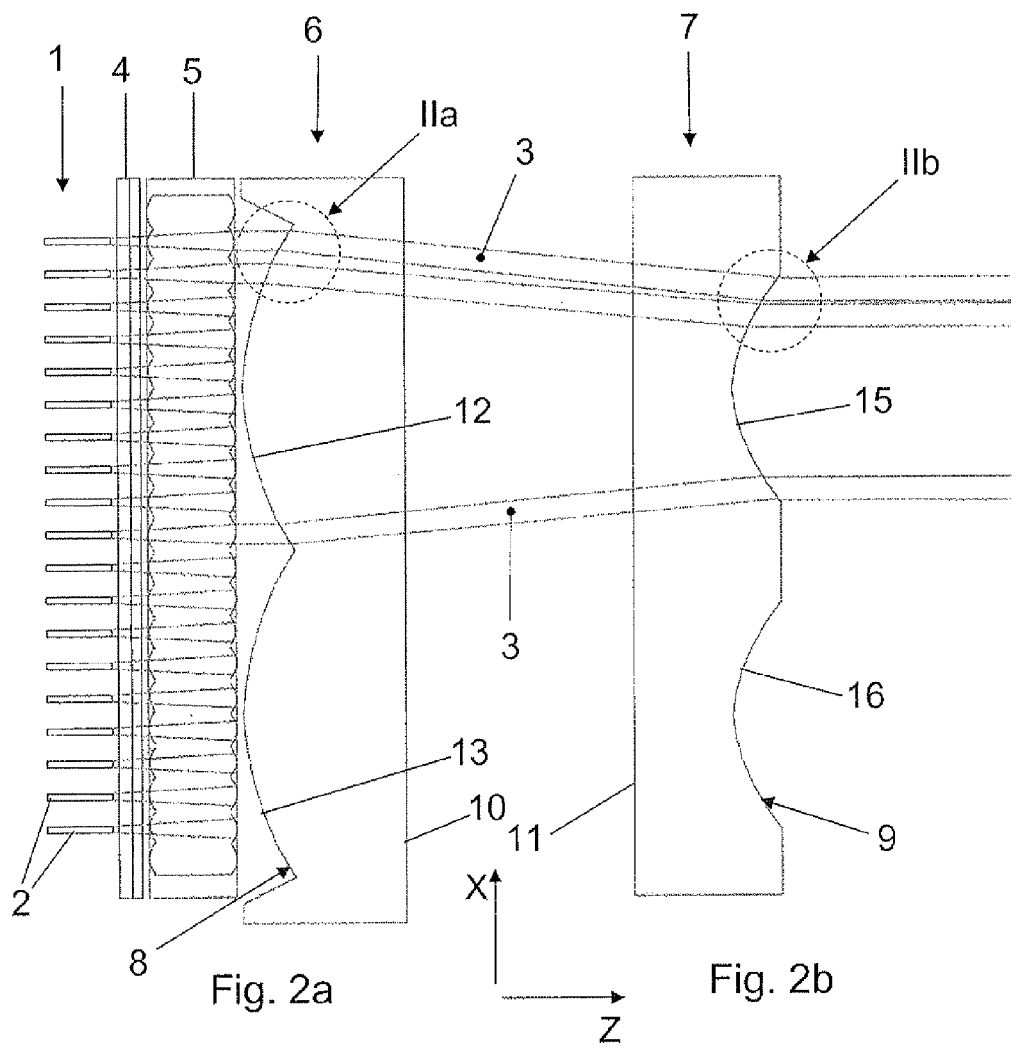
FIG. 1 shows a plan view of a device according to the invention with a laser diode bar and exemplary beam paths.

In FIG. 1, the reference 1 denotes a laser diode bar and the reference 2 denotes the individual emitters of the laser diode bar 1, which are arranged is spaced apart next to one another in the so-called slow axis i.e. the X direction in the figures. For example, each of the emitters 2 has a length of about 150 μm in the slow axis, the distance between two neighboring emitters 2 in this direction being about 400 μm. The individual emitters 2 emit sub-beams 3 of the laser radiation of the laser diode bar 1.

The embodiment of a device according to the invention, which may be seen in FIG. 1, comprises a fast-axis collimation lens 4 behind the emitters 2 in the propagation direction Z, which collimates the individual sub-beams 3 in the so-called fast axis i.e. the Y direction in the figures.

Behind the fast-axis collimation lens 4 in the propagation direction Z, a beam transformation device 5 is provided which rotates each of the individual sub-beams through 90° with respect to the propagation direction Z. The divergence of the sub-beams in the fast axis is therefore interchanged with that in the slow axis, so that the sub-beams 3 are collimated in the slow axis i.e. the X direction in the figures after passing through the beam transformation device 5. Such beam transformation devices 5 are widely known and have for example cylinder lenses arranged next to one another in the X direction, the cylinder axes of which are oriented at an angle of 45° to the Y direction in the X-Y plane.

Behind the beam transformation device 5 in the propagation direction Z, the device furthermore comprises two substrates 6, 7 which are arranged successively, spaced apart, in the propagation direction Z. The first substrate 6 has a first refractive interface 8 on its side facing the beam transformation device 5. The second substrate 6 has a second refractive interface 9 on its side facing away from the substrate 6. The mutually facing sides 10, 11 of the substrates 6, 7 are respectively designed to be flat.

The first refractive interface 8, serving as the entry surface of the first substrate 6, has two convex cylindrical contours 12, 13 adjoining one another in the X direction, the cylinder axes of which extend in the Y direction. On each of the convex contours 12, 13, there are plane surfaces 14 adjoining one another in the X direction, which respectively make an angle α with one another (see FIG. 2a). The angles α between the surfaces increases from the outside inward in the X direction, the angle α being for example about 175.5° in the outer edge regions of the convex cylindrical contours 12, 13 and about 179° in the middle of the convex cylindrical contours 12, 13. The plane surfaces 14 are dimensioned and arranged so that one of the sub-beams 3 always strikes one of the plane surface 14. Owing to the plane surfaces 14, the sub-beams 3 are deviated so that they travel converging together and all converge on an imaginary point behind the second substrate 7.

The second refractive interface 9, serving as the exit surface of the second substrate 7, has two concave cylindrical contours 15, 16 arranged spaced apart in the X direction, the cylinder axes of which likewise extend in the Y direction. On each of the concave contours 15, 16, there are plane surfaces 17 adjoining one another in the X direction, which respectively make an angle β with one another (see FIG. 2b). The angles β between the surfaces 17 decrease from the outside inward in the X direction, the angle β being for example about 184.5° in the outer edge regions of the concave cylindrical contours 15, 16 and about 181° in the middle of the concave cylindrical contours 15, 16. The plane surfaces 17 are dimensioned and arranged so that one of the sub-beams 3, deviated by the plane surfaces 14 of the first refractive interface 8, always strikes one of the plane surfaces 17 of the second refractive interface 9. Owing to the plane surface 17, the sub-beams 3 converging together are deviated so that they travel again mutually parallel after passing through the second refractive interface 9.

Figures 2A, 2B:
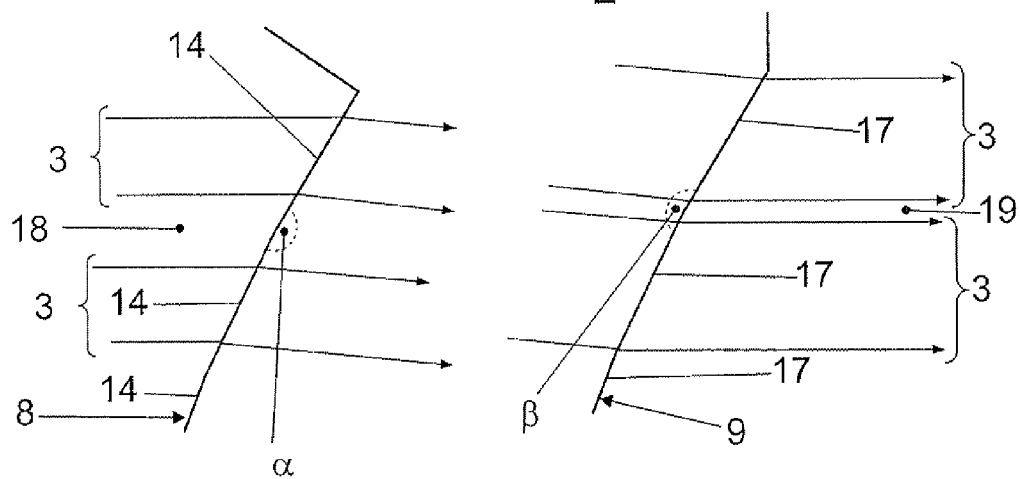
FIG. 2a shows a detail view according to the arrow IIa in FIG. 1.
FIG. 2b shows a detail view according to the arrow IIb in FIG. 1.
Figure 3:
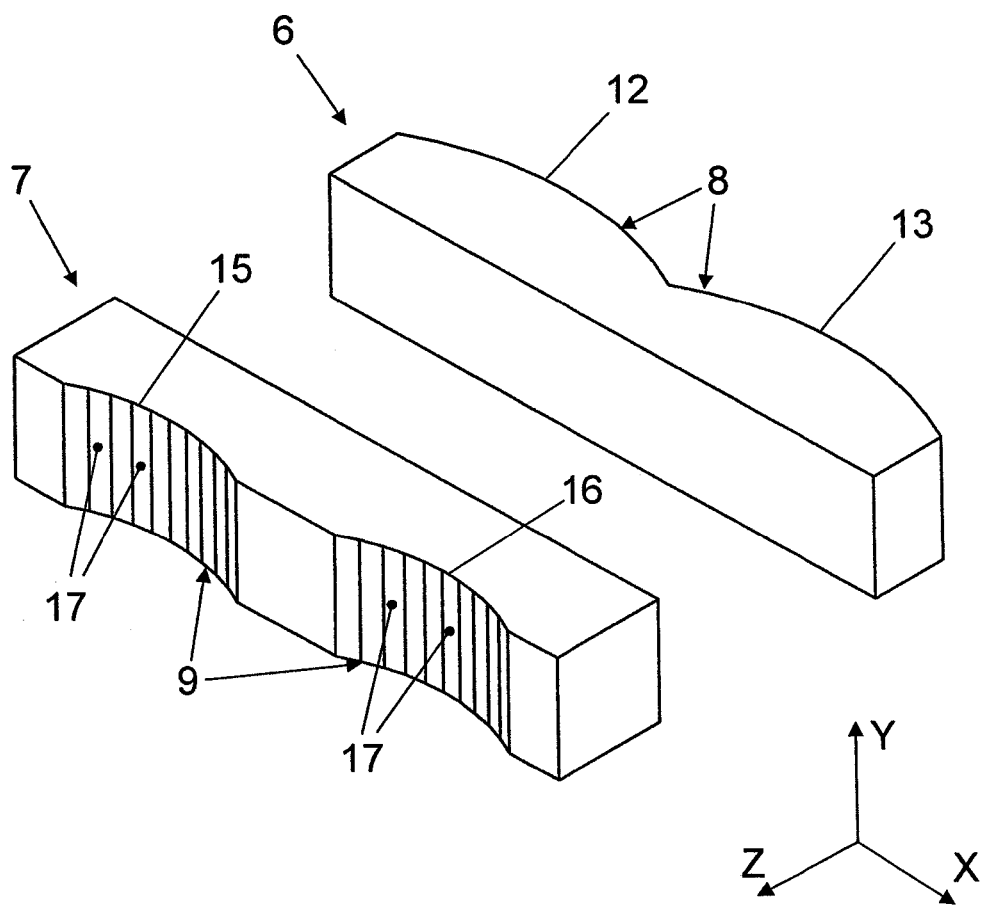
FIG. 3 shows a perspective view of the two substrates, which contribute to the shaping, of the device according to FIG. 1.

By comparing FIG. 2a and FIG. 2b, it can be seen that the dark regions 18 between the sub-beams 3 before passing through the two refractive interfaces 8, 9 are significantly more extended in the X direction than the dark regions 19 between the sub-beams 3 after passing through the two refractive interfaces 8, 9. In the ideal case, dark regions 19 between the sub-beams 3 are approximately zero in the X direction after passing through the two refractive interfaces 8, 9.

Behind the two substrates 6, 7, slow-axis collimation means (not shown) may be provided which can reduce the remaining divergence of the sub-beams 3 in the Y direction.

The invention claimed is:

1. A device for shaping laser radiation which has sub-beams (3) spaced apart in a first direction (X) perpendicular to the propagation direction (Z) of the laser radiation, in particular for shaping laser radiation which is output by a laser diode bar (1), comprising
a first refractive interface (8) differently deviates at least a multiplicity of the sub-beams (3) of the laser radiation to be shaped, so that they travel at least partially converging together after passing through the first interface (8) more than before passing through the first interface (8),
a second refractive interface (9) through which the laser radiation passes after having passed through the first interface (8), the second interface (9) deviates at least some of the sub-beams (3) so that their convergence is reduced; and
two substrates (6, 7) arranged successively but spaced apart from one another in the propagation direction (Z) of the laser radiation;
the first and second of the refractive interfaces (8, 9) respectively comprise a multiplicity of mutually inclined surfaces (14, 17), at least one of the sub-beams (3) passes through each of the surfaces (14, 17); the mutually inclined surfaces (14, 17) of each of the two refractive interfaces (8, 9) are arranged respectively on at least one cylindrical contour (12, 13, 15, 16); the at least one cylindrical contour (12, 13) on the first refractive interface (8) is shaped convexly and the at least one cylindrical contour (15, 16) on the second refractive interface (9) is shaped concavely; the first refractive interface (8) is an entry surface of the first substrate (6) and the second refractive interface (9) is an exit surface of the second substrate (7).

2. The device as claimed in claim 1, wherein the first refractive interface (8) differently deviates at least a multiplicity of the sub-beams (3) of the laser radiation to be shaped, so that after passing through the first interface (8) they are aligned at a point which is arranged behind the second refractive interface (9) in the propagation direction (Z) of the laser radiation.

3. The device as claimed in claim 1, wherein the device comprises collimation means which at least partially collimates the laser radiation with respect to the first direction (X) and/or with respect to a second direction (Y) which is perpendicular to the first direction (X) and to the propagation direction (Z) of the laser radiation, the collimation means being arranged before the first refractive interface (8) in the propagation direction (Z) of the laser radiation for collimation in the second direction (Y).

4. The device as claimed in claim 1, wherein the second interface (9) deviates at least some of the sub-beams (3) so that the convergence of the sub-beams (3) is reduced, such that they travel mutually parallel with deviations of ±10%, preferably ±5%, in particular ±1%.

5. The device as claimed in claim 1, wherein the mutually inclined surfaces (14, 17) are at least partially plane.

6. The device as claimed in claim 1, wherein the mutually inclined surfaces (14, 17) at least partially adjoin one another in the first direction (X).

7. The device as claimed in claim 1, wherein the cylinder axis of the at least one cylindrical contour (12, 13, 15, 16) extends in the second direction (Y).

8. The device as claimed in claim 1, wherein the surfaces (14) of the first refractive interface (8), which adjoin one another in the first direction (X), at least partially make an angle of between 150° and 180° with one another, in particular an angle of between 165° and 180°, preferably an angle of between 175° and 179°.

9. The device as claimed in claim 1, wherein the surfaces (17) of the second refractive interface (9), which adjoin one another in the first direction (X), at least partially make an angle of between 180° and 210° with one another, in particular an angle of between 180° and 195°, preferably an angle of between 181° and 185°.

10. The device as claimed in claim 1, wherein the first and/or second of the refractive interfaces (8, 9) has at least two groups of mutually inclined surfaces (14, 17), each of the groups being arranged on its own cylindrical contour (12, 13, 15, 16).

11. The device as claimed in claim 10, wherein the at least two cylindrical contours (12, 13) on the first refractive interface (8) are arranged next to one another in the first direction (X).

12. The device as claimed in claim 10, wherein the at least two cylindrical contours (15, 16) on the second refractive interface (9) are arranged spaced apart in the first direction (X).

13. The device as claimed in claim 1, wherein the exit surface of the first substrate (6) is plane and/or the entry surface of the second substrate (7) is planar.

14. A device for shaping laser radiation which has sub-beams (3) spaced apart in a first direction (X) perpendicular to the propagation direction (Z) of the laser radiation for shaping laser radiation which is output by a laser diode bar (1), comprising
a first refractive interface (8) differently deviates at least a multiplicity of the sub-beams (3) of the laser radiation to be shaped, so that they travel at least partially converging together after passing through the first interface (8) more than before passing through the first refractive interface (8); and
a second refractive interface (9) through which the laser radiation passes after having passed through the first refractive interface (8), the second refractive interface (9) deviates at least some of the sub-beams (3) so that their convergence is reduced;

at least one of the first and second of the refractive interfaces comprises a plurality of mutually inclined surfaces; the plural mutually inclined surfaces at least partially adjoin one another in the first direction; the plural mutually inclined surfaces of each of the two refractive interfaces are arranged respectively on at least one convex cylindrical contour; and angles between the plural mutually inclined surfaces increase or decrease in the first direction from an outer edge region of the at least one convex cylindrical contour to a middle of the at least one convex cylindrical contour.

* * * * *